United States Patent
Watanabe et al.

(10) Patent No.: US 7,201,994 B2
(45) Date of Patent: Apr. 10, 2007

(54) NON-AQUEOUS ELECTROLYTE SECONDARY BATTERY

(75) Inventors: Shoichiro Watanabe, Ikoma-gun (JP); Noriyuki Ohira, Ube (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 364 days.

(21) Appl. No.: 10/203,237

(22) PCT Filed: Dec. 5, 2001

(86) PCT No.: PCT/JP01/10655

§ 371 (c)(1),
(2), (4) Date: Aug. 6, 2002

(87) PCT Pub. No.: WO02/054524

PCT Pub. Date: Jul. 11, 2002

(65) Prior Publication Data

US 2003/0091892 A1    May 15, 2003

(30) Foreign Application Priority Data

Dec. 28, 2000   (JP)   ............... 2000-402935

(51) Int. Cl.
*H01M 10/50*   (2006.01)
(52) U.S. Cl. .............. 429/62; 429/61; 429/328; 429/217; 429/232; 429/245
(58) Field of Classification Search ............ 429/62, 429/245, 232, 217
See application file for complete search history.

(56) References Cited

U.S. PATENT DOCUMENTS

| | | | |
|---|---|---|---|
| 4,943,497 A | 7/1990 | Oishi et al. | |
| 5,783,326 A | 7/1998 | Hasebe | |
| 5,879,834 A | 3/1999 | Mao | |
| 5,940,958 A | 8/1999 | Shaw, Jr. et al. | |
| 5,955,936 A | 9/1999 | Shaw, Jr. et al. | |
| 6,074,777 A | 6/2000 | Reimers et al. | |
| 2003/0118912 A1* | 6/2003 | Watanabe et al. | ........... 429/326 |

FOREIGN PATENT DOCUMENTS

| | | |
|---|---|---|
| EP | 0 454 422 A2 | 10/1991 |
| EP | 0 776 058 A2 | 5/1997 |
| EP | 0 878 861 A1 | 11/1998 |
| EP | 0 895 297 A1 | 2/1999 |
| JP | 01-206571 A | 8/1989 |
| JP | 02109259 A1 | 4/1990 |
| JP | 06-231749 A | 8/1994 |
| JP | 06-338347 A | 12/1994 |
| JP | 07-302614 A | 11/1995 |
| JP | 09-050822 A | 2/1997 |
| JP | 09-106835 A | 4/1997 |
| JP | 10-050342 A | 2/1998 |
| JP | 10-125353 A | 5/1998 |
| JP | 10-188945 A | 7/1998 |
| JP | 10-241655 A | 9/1998 |
| JP | 10-321258 A | 12/1998 |
| JP | 2939469 B1 | 6/1999 |
| JP | 2000-58116 A | 2/2000 |
| JP | 2000-58117 A | 2/2000 |
| JP | 2001-35537 A | 2/2001 |
| WO | WO 99/65101 A1 | 12/1999 |

* cited by examiner

*Primary Examiner*—Laura Weiner
(74) *Attorney, Agent, or Firm*—Akin Gump Strauss Hauer & Feld, LLP

(57) ABSTRACT

A non-aqueous electrolyte secondary battery comprising: a positive electrode comprising a positive electrode current collector and a positive electrode material mixture layer formed thereon; a negative electrode comprising a negative electrode current collector and a negative electrode material mixture layer formed thereon; and a non-aqueous electrolyte, characterized in that at least one of said positive and negative electrodes has a positive temperature coefficient of resistance; and said non-aqueous electrolyte contains an additive which is stable in the normal operating voltage range of said battery and is able to polymerize at the voltage exceeding the maximum value of said operating voltage range.

22 Claims, 1 Drawing Sheet

NON-AQUEOUS ELECTROLYTE SECONDARY BATTERY

TECHNICAL FIELD

The present invention relates to a non-aqueous electrolyte secondary battery having a high level of safety.

BACKGROUND ART

More electronic devices have rapidly become portable and cordless these days, and the demand for smaller and lighter secondary batteries having greater energy density, which serve as power source to operate these devices, is increasing. Above all, great expectations are placed on a non-aqueous electrolyte secondary battery employing a negative electrode having lithium as an active material since it has high voltage and high energy density.

The above-mentioned battery utilizes, for example, a lithium-containing metal oxide for the positive electrode active material. Likewise, materials capable of absorbing and desorbing lithium, such as carbon material, are employed for the negative electrode.

Assuring security is one of the important issues in non-aqueous electrolyte secondary batteries. In particular, when a lithium ion secondary battery is overcharged due to breakdown of a charge control circuit, excessive lithium ions in the positive electrode are extracted and migrate to the negative electrode. Accordingly, more of the prescribed amount of lithium is absorbed in the negative electrode or is deposited on the negative electrode surface as metallic lithium. If it is forcibly kept charging in such a state, internal resistance in the battery will increase, resulting in the excessive heat generation.

In order to cope with the excessive heat generation, it is proposed to provide a positive temperature coefficient (PTC) thermistor or a temperature sensing type current breaking device such as fuse outside the battery. Use of the temperature sensing type current breaking device allows the electric current to be cut off without fail, thereby safety of the battery can be ensured. Likewise, Japanese Laid-open patent publication No. Hei 6-231749, Hei 10-125353 and Hei 10-241665 have suggested a method to equip a current breaking device having a positive temperature coefficient of resistance inside the battery. The specification of U.S. Pat. No. 4,943,497 further disclosed a means for cutting off the charge current by sensing a change in the internal pressure of the battery from a viewpoint of solving the problem of overcharging. Referring conventional current breaking devices, however, cutting costs is difficult and providing them inside the small and thin battery is structurally troublesome.

Consequently, Japanese Laid-open patent publication No. Hei 1-206571, Hei 6-338347 and Hei 7-302614 have suggested a method in which an additive undergoing a reversible oxidation reduction reaction is added to an electrolyte and electric energy fed into the inside of a battery is self-consumed by redox shuttle mechanism. When the overcharge current is increased, however, it can be hardly say that the battery employing the redox shuttle mechanism is safe because the redox reaction rate and the lithium ion moving rate have their limits.

At the same time, Japanese Laid-open patent publication No. Hei 9-50822, Hei 10-50342, Hei 9-106835, Hei 10-321258, Japanese Patent No. 2939469 and Japanese Laid-open patent publication No. 2000-58117 have suggested a means for adding aromatic compounds having a methoxy group and a halogen element, biphenyl, thiophene, terphenyl, aromatic ether and the like to the inside of a battery. These additives polymerize in the moderate overcharge process to cause temperature increase in the battery. As a result, micropores of its separators are closed to cut off the electric current.

In the battery having a temperature sensing type current breaking device outside thereof and the one having a current breaking device having a positive temperature coefficient of resistance inside thereof as mentioned above, the device itself is heated and the resistance of the device is increased to cut off the current when a large amount of current, which is 5 to 6 times (5 to 6 C) or greater than the battery capacity, flows during overcharge. Conversely, when they are overcharged at the normal charge and discharge current (1 to 2 C) of battery, safety cannot be fully ensured because there is not an adequate increase in temperature and resistance of the devices. However, use of a device in which resistance increases at a current of 1 to 2 C will impair battery performance.

When the battery having an electrolyte added with the aforementioned additive is overcharged at the normal current (1 to 2 C), polymerization of the additive on the electrodes and increase in electrode resistance are observed. Conversely, when it is overcharged at a large current of 5 to 6 C, safety cannot be fully ensured because the polymerization of the additive lags behind the charge.

In the case that an additive is added to the electrolyte in the battery having a temperature sensing type current breaking device outside the battery, safety is ensured when overcharged at a current of 1 to 2 C or a large current of 5 C or more. When overcharged at a current of 3 to 5 C, however, safety is not fully assured because the temperature sensing type current breaking device does not operate sensitively and the polymerization of the additive lags behind the charge.

In view of the aforementioned facts, an object of the present invention is to provide a battery wherein safety is ensured even when it is overcharged in any current range.

DISCLOSURE OF INVENTION

The present invention relates to a non-aqueous electrolyte secondary battery comprising: a positive electrode comprising a positive electrode current collector and a positive electrode material mixture layer formed thereon; a negative electrode comprising a negative electrode current collector and a negative electrode material mixture layer formed thereon; and a non-aqueous electrolyte, characterized in that (1) at least one of the positive and negative electrodes has a positive temperature coefficient of resistance, (2) the non-aqueous electrolyte contains an additive which is stable at a normal operating voltage range of the battery and is able to polymerize at the voltage exceeding the maximum value of the above operating voltage range.

The non-aqueous electrolyte includes a liquid electrolyte comprising a solute and a non-aqueous solvent, a gel electrolyte comprising a host polymer retaining a liquid electrolyte, a solid polymer-electrolyte containing a solute.

It is preferable that a resistance value at 110 to 130° C. of at least one of the positive and negative electrodes is 100 times or greater than a resistance value at 25° C. of the same electrode. It is desirable, for instance, that the resistance value suddenly increases at around 120° C. to a hundredfold or more of the resistance value at room temperature.

It is preferable that a resistivity at 120° C. of at least one of the positive and negative electrodes is $10^7$ Ω·cm or more.

Any additive capable of polymerizing at the voltage exceeding the upper limit value of the normal operating voltage range of a battery may be utilized without limitations. In particular, it is effective to use at least one selected from a group consisting of biphenyl, 3-chlorothiophene, furan, o-terphenyl, m-terphenyl, p-terphenyl, diphenyl ether, 2,3-benzofuran, bis(p-tolyl)ether, diallyl ether, allyl butyl ether, 3-phenoxy toluene and cyclohexyl benzene. These additives may be employed alone or in combination of two or more.

It is effective to form a resistance layer having a positive temperature coefficient of resistance on the surface of the positive or negative electrode current collector in order to impart a positive temperature coefficient of resistance to the positive or negative electrode.

In the case of the positive electrode, for instance, it is effective to provide a resistance layer comprising a mixture of a conductive particulate material and a binder polymer on the surface of a current collector comprising aluminum. It is desirable that the conductive particulate material for the use of the positive electrode comprises a carbon material.

In the case of the negative electrode, for example, it is effective to provide a resistance layer comprising a mixture of a conductive particulate material and a binder polymer on the surface of a negative electrode current collector comprising copper or nickel. It is desirable that the conductive particulate material for the use of the negative electrode comprises nickel or copper.

It is desirable that a binder polymer for the positive or negative electrode is at least one selected from the group consisting of polyethylene, ethylene-vinyl acetate copolymer, ethylene-propylene copolymer, ethylene-propylene-vinyl acetate copolymer, polypropylene, polyacrylonitrile and aromatic hydrocarbon having a vinyl group-conjugated diene copolymer in that the strength of the electrode plate and the temperature coefficient of resistance are easily controlled. These binder polymers may be used alone or in combination of two or more.

It is desirable that a ratio of battery capacity C (mAh) to facing area A (cm$^2$) of the positive and negative electrodes: C/A value is 0.2 to 6.0 mAh/cm$^2$. In particular, it is preferable that C/A value is 0.2 to 4.5 mAh/cm$^2$ in that the high rate characteristics of the battery can be sufficiently maintained.

BEST MODE FOR CARRYING OUT THE INVENTION

Figure 1:
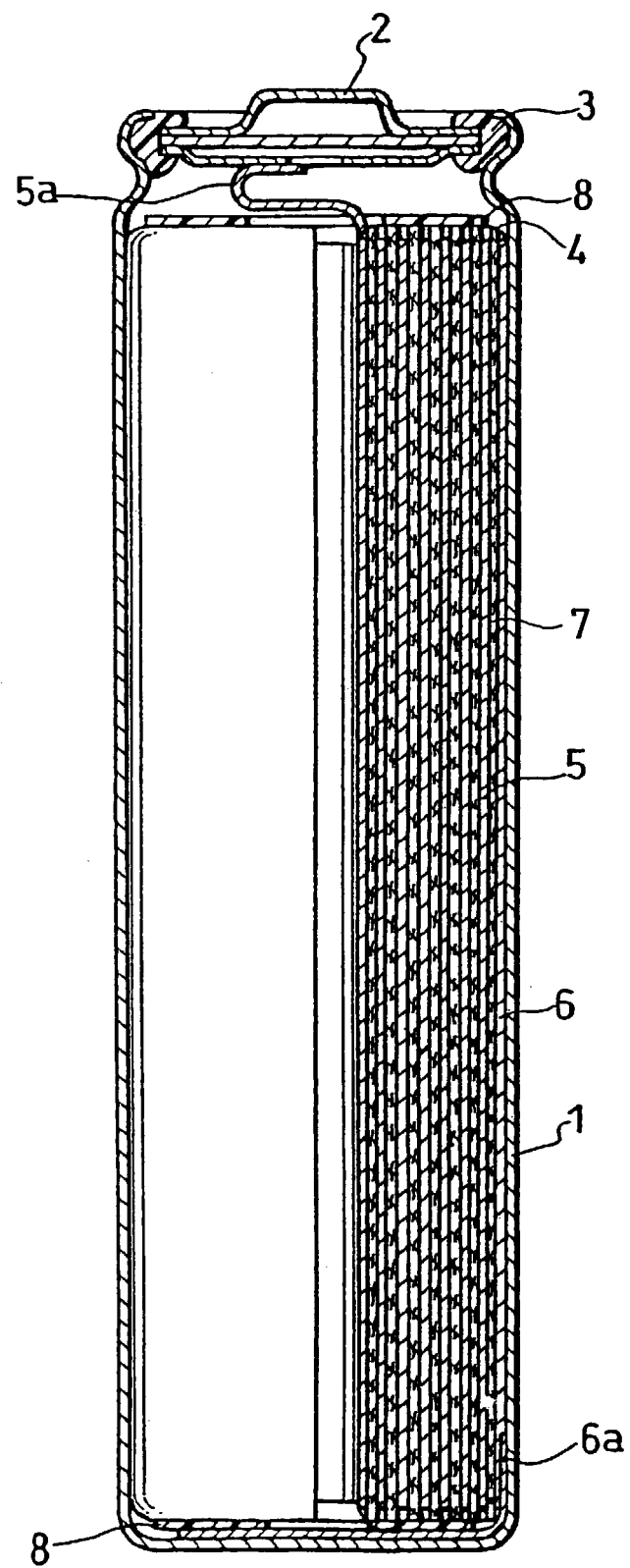
FIG. 1 is a vertical section of a cylindrical battery in accordance with an example of the present invention.

In the non-aqueous electrolyte secondary battery of the present invention, (1) at least one of the positive and negative electrodes has a positive temperature coefficient of resistance, (2) the non-aqueous electrolyte contains an additive which is stable at a normal operating voltage range of the battery and is able to polymerize at the voltage exceeding the maximum value of the operating voltage range.

The above-mentioned additive starts to polymerize on the positive electrode when the battery becomes overcharged. Since a copolymer is produced on the surface of the positive electrode, the oxidation-reduction reaction involving active material is impaired, the internal resistance of the battery starts to increase, thereby the battery heats. At this time, the temperature of the electrode plate having a positive temperature coefficient of resistance increases simultaneously, and the resistance of the electrode plate rises. Synergistic interaction between the increase in the internal resistance due to the additive and the rise in the electrode plate resistance allows the current to be promptly cut off even when the battery is overcharged at a current of 3 to 5 C.

Additionally, the polymerization reaction on the positive electrode remarkably decreases the efficiency in extraction of lithium ions from the positive electrode; therefore, decrease in the thermal stability of the positive electrode active material can also be prevented. Therefore, the present invention can practically provide extremely safer batteries, compared to the conventional ones.

In general, s temperature coefficient of resistance X can be expressed as:

$$X(\text{ppm}/°\text{C.}) = (R - R_0)/R_0(t - t_0) \times 10^6.$$

where R represents resistance ($\Omega$) at t° C., $R_0$ represents resistance ($\Omega$) at $t_0$° C.

The temperature coefficient of resistance X of at least one of the positive and negative electrodes for the use of the present invention is preferably $1 \times 10^6 \leq X \leq 1 \times 10^{10}$. It should be noted that the temperature coefficient of resistance X of the same electrode preferably undergoes a great change at, for example, 110 to 130° C.

The additive to be added to the electrolyte is not intended for the redox shuttle mechanism as described in Japanese Laid-Open Patent Publication No. Hei 7-302614 and Hei 9-50822. Accordingly, it is desirable that the oxidative polymerization of the additive is irreversible.

The aforementioned additive is required to be chemically stable at a normal operating voltage range of the battery, and immediate oxidative polymerization is necessary at the voltage in the overcharge range exceeding the maximum value of the operating voltage range. When a lithium containing transition metal oxide such as LiCoO$_2$, LiNiO$_2$ or LiMn$_2$O$_4$ is used for the positive electrode active material and a carbon material is employed for the negative electrode, for instance, the additive is stable at 0.03 to 4.3 V, but immediate oxidative polymerization is necessary at over 4.3 V.

It is preferable to employ, for example, biphenyl, 3-chlorothiophene, furan, o-terphenyl, m-terphenyl, p-terphenyl, diphenyl ether, 2,3-benzofuran, bis(p-tolyl)ether, diallyl ether, allyl butyl ether, 3-phenoxy toluene or cyclohexyl benzene for the above-mentioned additive. These may be used alone or in combination of two or more. These do not affect the battery performance as long as they are utilized in the normal voltage range, and they act effectively when the battery is overcharged.

It is effective to add 0.5 to 5 parts by weight of additive per 100 parts by weight of non-aqueous electrolyte.

The positive and negative electrodes usually have a plate-like shape. It is preferable that a ratio of battery capacity C (mAh) to facing area A (cm$^2$) of the positive and negative electrodes: C/A value is 0.2 to 6.0 mAh/cm$^2$. When C/A value is less than 0.2 mAh/cm$^2$, in other words, when the electrode plate area is too large against capacity C, it is not practical from the viewpoint of battery capacity. Conversely, when C/A value is over 6.0 mAh/cm$^2$, if the battery is charged and discharged with the normal current, the current density increases to provide a high possibility of raising the resistance of the electrode plate, therefore, it is not practical, either. Likewise, from the viewpoint of the high rate discharge characteristics of the battery, it is further preferable that C/A value is not more than 4.5 mAh/cm$^2$.

Any electronic conductor that does not induce chemical reaction inside the battery may be employed for the positive electrode current collector. The positive electrode current collector can be composed of, for example, stainless steel, aluminum, titanium or carbon. Among them, aluminum and aluminum alloy are particularly preferable.

As the positive electrode current collector, there are a foil, a film, a sheet, a net, a punched sheet, a lath, a porous sheet, a foam and a molded article formed by fiber bundle or non-woven fabric. The surface of the positive electrode current collector may be made rough by a surface treatment. The positive electrode current collector has a thickness of, for example, 1 to 500 μm.

Formation of a resistance layer having a positive temperature coefficient of resistance on the surface of the positive electrode current collector can give a positive electrode having a positive temperature coefficient of resistance.

Desirably, the resistance layer for the positive electrode comprises a mixture of a conductive particulate material and a binder polymer. The resistance layer is provided such that the surface of the positive electrode current collector is coated with the above-mentioned mixture to a thickness of, for example, 0.5 to 10 μm.

The conductive particulate material for the positive electrode desirably comprises a carbon material such as acetylene black or artificial graphite.

As the binder polymer for the positive electrode, polyethylene, ethylene-vinyl acetate copolymer, ethylene-propylene copolymer, ethylene-propylene-vinyl acetate copolymer, polypropylene, polyacrylonitrile, aromatic hydrocarbon having a vinyl group-conjugated diene copolymer (styrene-butadiene copolymer, for instance) or the like is preferable. These expand in high temperatures, which decreases the contact point of the particulate material and raises the resistance of the resistance layer. The binder polymer having a softening temperature of 110 to 130° C. is particularly effective.

In the resistance layer for the positive electrode, it is preferable to mix 0.5 to 10 parts by weight of, further preferably 0.5 to 5 parts by weight of, binder polymer with 100 parts by weight of particulate material.

As the positive electrode active material contained in the positive electrode material mixture layer, lithium-containing composite oxide is preferable. The lithium-containing composite oxide includes $Li_xCoO_z$, $Li_xNiO_z$, $Li_xMnO_z$, $Li_xCo_yNi_{1-y}O_z$, $Li_xCo_yV_{1-y}O_z$, $Li_xNi_{1-y}M_yO_z$ (M=Ti, V, Mn, Fe), $Li_xCo_aNi_bM_cO_z$ (M=Ti, Mn, Al, Mg, Fe, Zr), $Li_xMn_2O_4$, $Li_xMn_{2(1-y)}M_{2y}O_4$ (M=Na, Mg, Sc, Y, Fe, Co, Ni, Ti, Zr, Cu, Zn, Al, Pb, Sb) (where x=0 to 1.2, y=0 to 1.0, f=0.9 to 0.98, z=1.9 to 2.3, a+b+c=1.0, $0 \leq a \leq 1$, $0 \leq b \leq 1$, $0 \leq c < 1$). The x value mentioned above is the one before the start of charge and discharge of the battery; therefore, it varies with the charge and discharge. A plurality of different positive electrode active materials may be used simultaneously.

Lithium-containing composite oxide is synthesized by mixing carbonate, nitrate, oxide or hydroxide of lithium with carbonate, nitrate, oxide or hydroxide of a transition metal at a desired composition and pulverizing them, and then calcining the mixture. The calcination temperature is 250 to 1500° C., at which a portion of the materials is decomposed or molten. The calcination time is preferably 1 to 80 hours.

Any electronic conductor that does not induce chemical reaction inside the battery may be employed for the negative electrode current collector. The negative electrode current collector can be composed of, for example, stainless steel, nickel, copper or titanium. Among them, copper or copper alloy is preferable.

As the negative electrode current collector, there are a foil, a film, a sheet, a net, a punched sheet, a lath, a porous sheet, a foam and a molded article formed by fiber bundle or non-woven fabric. The surface of the negative electrode current collector may be made rough by a surface treatment. The negative electrode current collector has a thickness of, for instance, 1 to 500 μm, and preferably, 1 to 15 μm.

Formation of a resistance layer having a positive temperature coefficient of resistance on the surface of the negative electrode current collector can give a negative electrode having a positive temperature coefficient of resistance.

Desirably, the resistance layer for the negative electrode comprises a mixture of a conductive particulate material and a binder polymer. The resistance layer is provided such that the surface of the negative electrode current collector is coated with the above-mentioned mixture to a thickness of, for example, 0.5 to 10 μm.

The conductive particulate material for the negative electrode desirably comprises a chemically stable material such as nickel or copper. It is desirable that the mean diameter of the particulate material is 0.5 to 10 μm.

The binder polymer for the negative electrode preferably comprises polyethylene, ethylene-vinyl acetate copolymer, ethylene-propylene copolymer, ethylene-propylene-vinyl acetate copolymer, polypropylene, polyacrylonitrile, aromatic hydrocarbon having a vinyl group-conjugated diene copolymer or the like.

In the resistance layer for the negative electrode, it is preferable to mix 0.5 to 10 parts by weight, further preferably 0.5 to 5 parts by weight, of binder polymer with 100 parts by weight of particulate material.

As the material contained in the negative electrode material mixture layer, there are lithium alloy, alloy, intermetallic compound, carbon material, organic compound, inorganic compound, metal complex and organic polymer compound. These may be used alone or in combination.

As the carbon material, there are coke, thermally decomposed carbon, natural graphite, artificial graphite, mesocarbone microbeads, graphitized mesophase spherules, vapor phase growth carbon, glassy carbon, carbon fiber, amorphous carbon, and calcined product of organic compound. These may be employed alone or in combination. Among them, graphitized mesophase spherules, natural graphite, or artificial graphite is preferable.

When Li is contained in the positive electrode active material, carbon containing no Li can be employed for the negative electrode material. Incidentally, it is preferable that 0.01 to 10 parts by weight of Li is contained per 100 parts by weight of the negative electrode material containing no Li originally. In order to allow the negative electrode material to contain Li, it is recommendable that metallic lithium having been heated and molten is applied onto the current collector with the negative electrode material being pressed thereto, or that the negative electrode material is electrochemically doped with lithium in electrolyte after the metallic lithium is attached to the negative electrode.

As the binder contained in the positive or negative electrode material mixture, there are fluorocarbon resin such as polyvinylidene fluoride or polytetrafluoroethylene, acrylic resin, styrene-butadiene rubber and ethylene-propylene copolymer. These may be used alone or in combination.

The non-aqueous electrolyte employed in the present invention preferably comprises a non-aqueous solvent and a lithium salt. As the non-aqueous solvent, for instance, cyclic carbonate such as ethylene carbonate, propylene carbonate, butylene carbonate or vinylene carbonate; noncyclic carbonate such as dimethyl carbonate, diethyl carbonate, ethylmethyl carbonate, methyl propyl carbonate, methyl-isopropyl carbonate or dipropyl carbonate; aliphatic carboxylic acid ester such as methyl formate, methyl acetate, methyl propionate or ethyl propionate; γ-lactone such as γ-butyrolactone; noncyclic ether such as 1,2-dimethoxyethane, 1,2-diethoxyethane, ethoxy methoxy ethane; cyclic ether such as tetrahydrofuran, 2-methyl tetrahydrofuran; alkyl phosphate or its fluoride such as dimethyl sulfoxide, 1,3-dioxolane, trimethyl phosphate, triethyl phosphate or trioctyl phosphate. These may be employed alone or in combination of two or more. Among them, it is preferable to use a mixture of cyclic carbonate and noncyclic carbonate, or a mixture of cyclic carbonate, noncyclic carbonate and aliphatic carboxylic acid ester.

As the lithium salt to be dissolved in the non-aqueous solvent, $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiAsF_6$, $LiN(CF_3SO_2)_2$, $Li_2B_{10}Cl_{10}$, $LiN(C_2F_5SO_2)_2$, $LiPF_3(CF_3)_3$, $LiPF_3(C_2F_5)_3$ and the like can be cited as examples. These may be used alone or in combination of two or more. It is particularly preferable to employ $LiPF_6$. As a particularly preferable non-aqueous electrolyte, there is a non-aqueous electrolyte comprising $LiPF_6$ dissolved in a mixed solvent comprising ethylene carbonate and ethylmethyl carbonate.

A preferable concentration of the lithium salt in the non-aqueous electrolyte is 0.2 to 2 mol/liter, and 0.5 to 1.5 mol/liter is preferable in particular. The amount of non-aqueous electrolyte to be injected into the battery varies according to the capacity of electrodes and the size of the battery.

A gel electrolyte wherein a liquid non-aqueous electrolyte having been made retained in a host polymer can be employed. As the host polymer, there are polyethylene oxide, polypropylene oxide, polyvinylidene fluoride, and their derivatives, for instance. Especially, a copolymer of polyvinylidene fluoride and hexafluoropropylene or a mixture of polyvinylidene fluoride and polyethylene oxide is preferable.

As the separator, an insulative microporous thin film or a non-woven fabric having a great ion permeability and a desired mechanical strength, is utilized. It is preferable to use a separator having a function to close its micropores at a temperature of 80° C. or higher. The separator is composed of olefin such as polypropylene, polyethylene, glass fiber or the like from the viewpoint of resistance to the non-aqueous solvent and hydrophobicity. A preferable micropore diameter of the separator is the size that the active material, binder or conductive agent come off the electrode plate cannot pass through, specifically, 0.01 to 1 μm. Generally, the separator has a thickness of 5 to 300 μm and a porosity of 30 to 80%.

The present invention can be applied to any form of battery such as sheet, cylindrical, flat or square. In the case of cylindrical or square battery, cylindrical electrode assembly or the one having an ellipse section is constituted such that the positive and negative electrodes sandwiching a separator therebetween are laminated and wound. It is preferable to provide a safety valve in the battery.

Examples of the present invention are described below referring to the drawing.

EXAMPLE 1

(i) Positive Electrode

Acetylene black serving as the conductive particulate material and polyethylene serving as the binder polymer and having a softening temperature of 120° C. were mixed in a weight ratio of 10:1, and a proper amount of carboxymethyl cellulose was added thereto as the thickener to give a paste like mixture.

Both sides of a 10 μm thick aluminum foil serving as the positive electrode current collector were coated with the aforementioned mixture to a thickness of 5 μm or less, and dried to yield a resistance layer.

The positive electrode material mixture was prepared by mixing 100 parts by weight of $LiCoO_2$ powder, 3 parts by weight of acetylene black and 7 parts by weight of fluorocarbon resin type binder (polytetrafluoroethylene) with a proper amount of carboxymethyl cellulose aqueous solution. The above-mentioned $LiCoO_2$ powder was synthesized by calcining a mixture of $Li_2CO_3$ and $Co_3O_4$ at 900° C. for 10 hours.

Both sides of the positive electrode current collector having a resistance layer were coated with the obtained positive electrode material mixture, dried and rolled with pressure to give a positive electrode having a thickness of 0.17 mm, a width of 55 mm and a length of 540 mm. A lead made of aluminum was attached to the positive electrode.

The resistance value of the obtained positive electrode having the resistance layer was observed to suddenly increase at around 120° C., which is the softening temperature of polyethylene, to a hundredfold or more of the resistance value at room temperature. The resistance value of the positive electrode at 120° C. was $3.0 \times 10^7$ Ω·cm.

(ii) Negative Electrode

The negative electrode material mixture was prepared by mixing 100 parts by weight of mesophase graphite and 5 parts by weight of styrene-butadiene rubber with carboxymethyl cellulose aqueous solution. The aforementioned mesophase graphite was prepared by graphitizing mesophase microspheres at 2800° C.

Both sides of 0.01 mm thick Cu foil were coated with the aforementioned negative electrode material mixture, dried and rolled with pressure to produce a negative electrode having a thickness of 0.156 mm, a width of 56 mm and a length of 585 mm. A lead made of nickel was attached to the negative electrode.

(iii) Non-Aqueous Electrolyte

The non-aqueous electrolyte was prepared by dissolving $LiPF_6$ in a mixed solvent comprising ethylene carbonate and diethyl carbonate at a volume ratio of 30:70, at a concentration of 1 mol/liter. 2 parts by weight of biphenyl per 100 parts by weight of the non-aqueous electrolyte was added as the additive.

(iv) The Assembly of a Cylindrical Battery

It is described referring to FIG. 1.

A battery case 1 having a diameter of 18.0 mm and a height of 65.0 mm was produced by processing a stainless steel plate. The battery case 1 housed an electrode assembly 4 wherein a positive electrode 5 and a negative electrode 6 sandwiching a polyethylene separator 7 having a thickness of 0.018 mm, a width of 58 mm and a length of 1430 mm were spirally wound. Insulating rings 8 were respectively provided on and beneath the electrode assembly 4. The positive electrode 5 and a sealing plate 2 were connected with a positive electrode lead 5a, and the negative electrode 6 and the bottom surface inside the battery case 1 were connected with a negative electrode lead 6a. The opening of the battery case 1 was sealed with the sealing plate 2 having a safety valve and an insulating packing 3 after the above-mentioned non-aqueous electrolyte was poured therefrom, thereby a battery 1 was obtained. The Battery 1 had a capacity C of 2100 mAh, and a ratio of battery capacity C to facing area A of the positive and negative electrodes: C/A was 3.54 mAh/cm$^2$.

EXAMPLE 2

Cylindrical batteries were constructed as in Example 1 except that 3-chlorothiophene, furan, o-terphenyl, m-terphenyl, p-terphenyl, diphenyl ether, 2,3-benzofuran, bis(p-tolyl) ether, diallyl ether, allyl butyl ether, 3-phenoxy toluene or cyclohexyl benzene was used as the additive. They were named as Batteries 2 to 13. C/A value of Batteries 2 to 13 was also 3.54 mAh/cm$^2$, which was the same as that of Battery 1.

EXAMPLE 3

(i) Both sides of 10 μm thick aluminum foil serving as the positive electrode current collector were directly coated with the same positive electrode material mixture as that in Example 1, dried and rolled with pressure to give a positive electrode having a thickness of 0.16 mm, a width of 55 mm and a length of 540 mm. Accordingly, this electrode does not have a resistance layer.

(ii) Nickel powder serving as the conductive particulate material and polyethylene serving as the binder polymer and having a softening temperature of 120° C. were mixed in a weight ratio of 10:1, and a proper amount of carboxymethyl cellulose was added thereto as the thickener to give a paste like mixture.

Both sides of 10 μm thick copper foil serving as the negative electrode current collector were coated with the aforementioned mixture to a thickness of 5 μm or less, and dried to provide a resistance layer.

Both sides of the negative electrode current collector having the obtained resistance layer were coated with the same negative electrode material mixture as that in Example 1, dried and rolled with pressure to produce a negative electrode having a thickness of 0.166 mm, a width of 56 mm and a length of 585 mm.

The resistance value of the obtained negative electrode having the resistance layer was observed to suddenly increase at around 120° C., which is the softening temperature of the polyethylene, to a hundredfold or more of the resistance value at room temperature.

Battery 14 was produced as Battery 1 of Example 1 with the use of the obtained positive and negative electrodes. The battery 14 had a capacity C of 2100 mAh, and a ratio of battery capacity C to facing area A of the positive and negative electrodes: C/A was 3.54 mAh/cm$^2$.

EXAMPLE 4

The length of the positive electrode current collector having the resistance layer and the amount of the positive electrode material mixture to be applied thereon were adjusted to obtain a positive electrode having a thickness of 0.0183 mm, a width of 55 mm and a length of 2800 mm. Likewise, the length of the negative electrode current collector and the amount of the negative electrode material mixture to be applied thereon were adjusted to obtain a negative electrode having a thickness of 0.017 mm, a width of 56 mm and a length of 2845 mm. Battery 15 was constructed as in Example 1 except that the above-mentioned positive and negative electrodes and a polyethylene separator having a thickness of 0.018 mm, a width of 58 mm and a length of 5950 mm were used. Battery 15 had a capacity C of 632 mAh, and a ratio of battery capacity C to facing area A of the positive and negative electrodes: C/A was 0.205 mAh/cm$^2$.

EXAMPLE 5

The length of the positive electrode current collector having the resistance layer and the amount of the positive electrode material mixture to be applied thereon were adjusted to obtain a positive electrode having a thickness of 0.284 mm, a width of 55 mm and a length of 330 mm. Likewise, the length of the negative electrode current collector and the amount of the negative electrode material mixture to be applied thereon were adjusted to obtain a negative electrode having a thickness of 0.26 mm, a width of 56 mm and a length of 375 mm. Battery 16 was constructed as in Example 1 except that the above-mentioned positive and negative electrodes and a polyethylene separator having a thickness of 0.018 mm, a width of 58 mm and a length of 1010 mm were used. Battery 16 had a capacity C of 2180 mAh, and a ratio of battery capacity C to facing area A of the positive and negative electrodes: C/A was 6.01 mAh/cm$^2$.

EXAMPLE 6

The length of the positive electrode current collector having the resistance layer and the amount of the positive electrode material mixture to be applied thereon were adjusted to obtain a positive electrode having a thickness of 0.214 mm, a width of 55 mm and a length of 440 mm. Likewise, the length of the negative electrode current collector and the amount of the negative electrode material mixture to be applied thereon were adjusted to obtain a negative electrode having a thickness of 0.20 mm, a width of 56 mm and a length of 485 mm. Battery 17 was constructed as in Example 1 except that the above-mentioned positive and negative electrodes and a polyethylene separator having a thickness of 0.18 mm, a width of 58 mm and a length of 1230 mm were used. Battery 17 had a capacity C of 2140 mAh, and a ratio of battery capacity C to facing area A of the positive and negative electrodes: C/A was 4.5 mAh/cm$^2$.

COMPARATIVE EXAMPLE 1

Battery 18 which is the same as that of Example 1 was constructed except that no resistance layer was provided on the positive electrode current collector and no additive was added to the non-aqueous electrolyte.

COMPARATIVE EXAMPLE 2

Battery 19 which is the same as that of Example 1 was constructed except that no resistance layer was provided on the positive electrode current collector. Accordingly, Battery 19 does not have a resistance layer on the positive electrode, but its non-aqueous electrolyte contains the additive.

COMPARATIVE EXAMPLE 3

Battery 20 which is the same as that of Example 1 was constructed except that no additive was added to the electrolyte. Accordingly, Battery 20 has a resistance layer on the positive electrode, but its non-aqueous electrolyte does not contain the additive.

COMPARATIVE EXAMPLE 4

Battery 21 which is the same as battery 19 of Comparative Example 2 was constructed except that a PTC device was serially arranged on the outer surface of the battery case.

EXAMPLE 7

The length of the positive electrode current collector having the resistance layer and the amount of the positive electrode material mixture to be applied thereon were adjusted to obtain a positive electrode having a thickness of 0.34 mm, a width of 55 mm and a length of 275 mm. Likewise, the length of the negative electrode current collector and the amount of the negative electrode material mixture to be applied thereon were adjusted to obtain a negative electrode having a thickness of 0.31 mm, a width of 56 mm and a length of 320 mm. Battery 22 which is the same as that of Example 1 was constructed except that the above-mentioned positive and negative electrodes and a polyethylene separator having a thickness of 0.018 mm, a width of 58 mm and a length of 900 mm were used. Battery 22 had a capacity C of 2180 mAh, and a ratio of battery capacity C to facing area A of the positive and negative electrodes: C/A was 7.2 mAh/cm$^2$.

EXAMPLE 8

The length of the positive electrode current collector having the resistance layer and the amount of the positive electrode material mixture to be applied thereon were adjusted to obtain a positive electrode having a thickness of 0.0158 mm, a width of 55 mm and a length of 3040 mm. Likewise, the length of the negative electrode current collector and the amount of the negative electrode material mixture to be applied thereon were adjusted to obtain a negative electrode having a thickness of 0.015 mm, a width of 56 mm and a length of 3085 mm. Battery 23 which is the same as that of Example 1 was constructed except that the above-mentioned positive and negative electrodes and a polyethylene separator having a thickness of 0.018 mm, a width of 58 mm and a length of 6430 mm were used. Battery 23 had a capacity C of 502 mAh, and a ratio of battery capacity C to facing area A of the positive and negative electrodes: C/A was 0.15 mAh/cm$^2$.

Evaluation of Batteries

Overcharge was conducted on Batteries 1 to 23 by using 20 cells each.

Fully charged batteries at an environmental temperature of 20° C. were further overcharged at a current of 1 C, 3 C or 6 C to see whether the batteries would cause excessive heat generation. Tables 1 and 2 show the number of cells where excessive heat generation occurred.

TABLE 1

| No. | Additives | 1 C | 3 C | 6 C |
|---|---|---|---|---|
| 1 | Biphenyl | 0/20 | 0/20 | 0/20 |
| 2 | 3-chlorothiophene | 0/20 | 0/20 | 0/20 |
| 3 | Furan | 0/20 | 0/20 | 0/20 |
| 4 | o-terphenyl | 0/20 | 0/20 | 0/20 |
| 5 | m-terphenyl | 0/20 | 0/20 | 0/20 |
| 6 | p-terphenyl | 0/20 | 0/20 | 0/20 |
| 7 | Diphenyl ether | 0/20 | 0/20 | 0/20 |
| 8 | 2,3-benzofuran | 0/20 | 0/20 | 0/20 |
| 9 | Bis(p-tolyl)ether | 0/20 | 0/20 | 0/20 |
| 10 | Diallyl ether | 0/20 | 0/20 | 0/20 |
| 11 | Allyl butyl ether | 0/20 | 0/20 | 0/20 |
| 12 | 3-phenoxy toluene | 0/20 | 0/20 | 0/20 |
| 13 | Cyclohexyl benzene | 0/20 | 0/20 | 0/20 |
| 14 | Biphenyl | 0/20 | 0/20 | 0/20 |
| 15 | Biphenyl | 0/20 | 0/20 | 0/20 |
| 16 | Biphenyl | 0/20 | 0/20 | 0/20 |
| 17 | Biphenyl | 0/20 | 0/20 | 0/20 |

TABLE 2

| No. | Additives | 1 C | 3 C | 6 C |
|---|---|---|---|---|
| 18 | None | 18/20 | 20/20 | 20/20 |
| 19 | Biphenyl | 0/20 | 5/20 | 12/20 |
| 20 | None | 15/20 | 12/20 | 0/20 |
| 21 | Biphenyl | 0/20 | 7/20 | 0/20 |
| 22 | Biphenyl | 0/20 | 0/20 | 0/20 |
| 23 | Biphenyl | 0/20 | 0/20 | 0/20 |

As shown in Table 2, in Battery 18 of Comparative Example 1 without addition of an additive to the non-aqueous electrolyte and without an electrode plate having a positive temperature coefficient of resistance, excessive heat generation was observed in almost all of 20 cells when it was overcharged with whichever electric current.

In Battery 19 of Comparative Example 2 with addition of an additive to the non-aqueous electrolyte, excessive heat generation was able to be prevented at the normal charge current of 1 C, but the probability of excessive heat generation became high as the current value was increased to 3 C and 6 C. This is considered to be because increase in the charge current value decreases current efficiency in the polymerization reaction of the additive, and a lot of lithium is extracted from the positive electrode, as a result, safety is lowered. Accordingly, in order to improve safety during overcharge, it is inadequate just to add an additive.

In Battery 20 of Comparative Example 3 having the electrode plate having a positive temperature coefficient of resistance, excessive heat generation was able to be prevented when it was overcharged with a large current such as 6 C. This is considered to be because the binder polymer of the resistance layer expanded due to self heating to cut off the electronic network of the conductive particles, as a result, internal resistance increases rapidly and the electric current does not flow to the inside of the battery. When it was overcharged with a low current value of 1 C or 3 C, however, the resistance value did not rise, therefore, it is presumed that overcharge is allowed to proceed and a lot of lithium is extracted from the positive electrode, leading to lower safety.

When Battery 21 of Comparative Example 4, in which an additive was added to the non-aqueous electrolyte and a PTC was located outside the battery, was overcharged at a low current value of 1 C and at a high current value of 6 C, the additive and the PTC respectively functioned well, and safety was ensured; however, when it was overcharged at a current value of 3 C, the PTC did not work, and in addition to that, the current efficiency of polymerization reaction of the additive was also low, therefore, the ratio of battery causing excessive heat generation was 7/20, which was quite large.

On the other hand, Batteries 1 to 13 of the present invention did not cause excessive heat generation at all at every current value of 1 to 6 C. This is considered to be because the additive is polymerized to form a film on the surface of the positive electrode, and the reaction resistance increases to generate heat, resulting in rapid increase in resistance of the resistance layer provided on the electrode plate. Battery 14 of Example 3 employing the negative electrode having a positive temperature coefficient of resistance also showed similar effect.

The trip temperature where the charge efficiency of polymerization reaction of the additive and the resistance of the electrode plate having a positive temperature coefficient of resistance change suddenly is closely related to the current density during charging.

It has been ascertained from the results of Battery 15 of Example 4, Battery 16 of Example 5 and Battery 17 of Example 6 that an effect of the present invention, which is to improve safety, can be similarly ensured in the range that a ratio of battery capacity C to facing area A of the positive and negative electrodes: C/A is 0.2 to 6.0 mAh/cm$^2$.

On the other hand, the ratio of the discharge capacity at 2 C discharging to the discharge capacity at 0.2 C discharging differed considerably as 25% for Battery 16 having a C/A value of 6.0 mAh/cm$^2$ and 70% for Battery 17 having a C/A value of 4.5 mAh/cm$^2$. Accordingly, it can be said that C/A value is preferably 4.5 mAh/cm$^2$ or less from the viewpoint of high rate discharge characteristics.

Battery 22 of Example 7 having a C/A value of 7.2 mAh/cm$^2$ had a high level of safety, but it had large current densities even in the normal current range of charge and discharge; therefore, resistance of the resistance layer sometimes increased during 2 C discharging. Consequently, it can be said that C/A is preferably 6.0 mAh/cm$^2$ or less.

Likewise, in Battery 23 of Example 8 having a C/A value of 0.15 mAh/cm$^2$, safety was secured during overcharge, but the battery discharge capacity was 502 mAh, which turned out to be extremely low. Accordingly, it can be said that desirable C/A value is 0.2 mAh/cm$^2$ or more.

INDUSTRIAL APPLICABILITY

The present invention can provide a battery showing a high level of safety against overcharge in a wide current range by the interaction of the additive to be added to the non-aqueous electrolyte and the electrode plate having a positive temperature coefficient of resistance. With the use of the non-aqueous electrolyte secondary battery like this, devices having a high level of safety such as cell phone, portable information terminal, camcorder, personal computer, PDA, portable audio device, electric car, electric source for load leveling and the like can be provided.

The invention claimed is:

1. A non-aqueous electrolyte secondary battery comprising: a positive electrode comprising a positive electrode current collector and a positive electrode material mixture layer formed thereon; a negative electrode comprising a negative electrode current collector and a negative electrode material mixture layer formed thereon; and a non-aqueous electrolyte, characterized in that
    (1) at least one of said positive and negative electrodes has a positive temperature coefficient of resistance,
    (2) said non-aqueous electrolyte contains an additive which is stable at the normal operating voltage range of said battery and is able to polymerize at the voltage exceeding the maximum value of said operating voltage range, wherein said additive is at least one selected from the group consisting of biphenyl, 3-chlorothiophene, furan, o-terphenyl, m-terphenyl, p-terphenyl, diphenyl ether, 2,3-benzofuran, bis(p-tolyl)ether, diallyl ether, allyl butyl ether, 3-phenoxy toluene and cyclohexyl benzene,
    (3) a resistivity at 120° C. of at least one of said positive and negative electrodes is 10$^7$ Ω·cm or more, and
    (4) a resistance layer having a positive temperature coefficient of resistance is formed on a surface of at least one of said positive electrode current collector and said negative electrode current collector.

2. The non-aqueous electrolyte secondary battery in accordance with claim 1, wherein a resistance value at 110 to 130° C. of at least one of said positive and negative electrodes is 100 times or greater than a resistance value at 25° C. of the same electrode.

3. The non-aqueous electrolyte secondary battery in accordance with claim 1, wherein said positive electrode current collector comprises aluminum and said resistance layer comprises a mixture of a conductive particulate material and a binder polymer.

4. The non-aqueous electrolyte secondary battery in accordance with claim 3, wherein said particulate material comprises a carbon material.

5. The non-aqueous electrolyte secondary battery in accordance with claim 3, wherein said binder polymer is at least one selected from the group consisting of polyethylene, ethylene-vinyl acetate copolymer, ethylene-propylene copolymer, ethylene-propylene-vinyl acetate copolymer, polypropylene, polyacrylonitrile and aromatic hydrocarbon having vinyl group-conjugated diene copolymer.

6. The non-aqueous electrolyte secondary battery in accordance with claim 1, wherein said negative electrode current collector comprises copper or nickel and said resistance layer comprises a mixture of a conductive particulate material and a binder polymer.

7. The non-aqueous electrolyte secondary battery in accordance with claim 6, wherein said particulate material comprises copper or nickel.

8. The non-aqueous electrolyte secondary battery in accordance with claim 6, wherein said binder polymer is at least one selected from the group consisting of polyethylene, ethylene-vinyl acetate copolymer, ethylene-propylene copolymer, ethylene-propylene-vinyl acetate copolymer, polypropylene, polyacrylonitrile and aromatic hydrocarbon having a vinyl group-conjugated diene copolymer.

9. The non-aqueous electrolyte secondary battery in accordance with claim 1, wherein a ratio of battery capacity C (mAh) to facing area A (cm$^2$) of said positive and negative electrodes: C/A value is 0.2 to 6.0 mAh/cm$^2$.

10. The non-aqueous electrolyte secondary battery in accordance with claim 1, wherein a ratio of battery capacity C (mAh) to facing area A (cm$^2$) of said positive and negative electrodes: C/A value is 0.2 to 4.5 mAh/cm$^2$.

11. A non-aqueous electrolyte secondary battery comprising: a positive electrode comprising a positive electrode current collector and a positive electrode material mixture layer formed thereon; a negative electrode comprising a negative electrode current collector and a negative electrode material mixture layer formed thereon; and a non-aqueous electrolyte, characterized in that (1) said positive electrode has a positive temperature coefficient of resistance, (2) said non-aqueous electrolyte contains an additive which is stable at the normal operating voltage range of said battery and is able to polymerize at the voltage exceeding the maximum value of said operating voltage range, wherein said additive is at least one selected from the group consisting of biphenyl, 3-chlorothiophene, furan, o-terphenyl, m-terphenyl, p-terphenyl, diphenyl ether, 2,3-benzofuran, bis(p-tolyl)ether, diallyl ether, allyl butyl ether, 3-phenoxy toluene and cyclohexyl benzene, (3) a resistance layer having a positive temperature coefficient of resistance is formed on a surface of said positive electrode current collector, (4) said positive electrode current collector comprises aluminum and said resistance layer comprises a mixture of a conductive particulate material and a binder polymer, and (5) a resistivity at 120° C. of said positive electrode is $10^7$ $\Omega\cdot cm$ or more.

12. The non-aqueous electrolyte secondary battery in accordance with claim 11, wherein a resistance value at 110 to 130° C. of said positive electrode is 100 times or greater than a resistance value at 25° C. of the same electrode.

13. The non-aqueous electrolyte secondary battery in accordance with claim 11 wherein said particulate material comprises a carbon material.

14. The non-aqueous electrolyte secondary battery in accordance with claim 11 wherein said binder polymer is at least one selected from the group consisting of polyethylene, ethylene-vinyl acetate copolymer, ethylene-propylene copolymer, ethylene-propylene-vinyl acetate copolymer, polypropylene, polyacrylonitrile and aromatic hydrocarbon having vinyl group-conjugated diene copolymer.

15. The non-aqueous electrolyte secondary battery in accordance with claim 11 wherein a ratio of battery capacity C (mAh) to facing area A ($cm^2$) of said positive and negative electrodes: C/A value is 0.2 to 6.0 $mAh/cm^2$.

16. The non-aqueous electrolyte secondary battery in accordance with claim 11 wherein a ratio of battery capacity C (mAh) to facing area A ($cm^2$) of said positive and negative electrodes: C/A value is 0.2 to 4.5 $mAh/cm^2$.

17. A non-aqueous electrolyte secondary battery comprising: a positive electrode comprising a positive electrode current collector and a positive electrode material mixture layer formed thereon; a negative electrode comprising a negative electrode current collector and a negative electrode material mixture layer formed thereon; and a non-aqueous electrolyte, characterized in that (1) said negative electrode has a positive temperature coefficient of resistance, (2) said non-aqueous electrolyte contains an additive which is stable at the normal operating voltage range of said battery and is able to polymerize at the voltage exceeding the maximum value of said operating voltage range, wherein said additive is at least one selected from the group consisting of biphenyl, 3-chlorothiophene, furan, o-terphenyl, m-terphenyl, p-terphenyl, diphenyl ether, 2,3-benzofuran, bis(p-tolyl)ether, diallyl ether, allyl butyl ether, 3-phenoxy toluene and cyclohexyl benzene, (3) a resistance layer having a positive temperature coefficient of resistance is formed on a surface of said negative electrode current collector, (4) said negative electrode current collector comprises copper or nickel and said resistance layer comprises a mixture of a conductive particulate material and a binder polymers, and (5) a resistivity at 120° C. of said negative electrode is $10^7$ $\Omega\cdot cm$ or more.

18. The non-aqueous electrolyte secondary battery in accordance with claim 17 wherein a resistance value at 110 to 130° C. of said negative electrode is 100 times or greater than a resistance value at 25° C. of the same electrode.

19. The non-aqueous electrolyte secondary battery in accordance with claim 17 wherein said particulate material comprises copper or nickel.

20. The non-aqueous electrolyte secondary battery in accordance with claim 17 wherein said binder polymer is at least one selected from the group consisting of polyethylene, ethylene-vinyl acetate copolymer, ethylene-propylene copolymer, ethylene-propylene-vinyl acetate copolymer, polypropylene, polyacrylonitrile and aromatic hydrocarbon having a vinyl group-conjugated diene copolymer.

21. The non-aqueous electrolyte secondary battery in accordance with claim 17 wherein a ratio of battery capacity C (mAh) to facing area A ($cm^2$) of said positive and negative electrodes: C/A value is 0.2 to 6.0 $mAh/cm^2$.

22. The non-aqueous electrolyte secondary battery in accordance with claim 17 wherein a ratio of battery capacity C (mAh) to facing area A ($cm^2$) of said positive and negative electrodes: C/A value is 0.2 to 4.5 $mAh/cm^2$.

* * * * *

UNITED STATES PATENT AND TRADEMARK OFFICE
CERTIFICATE OF CORRECTION

PATENT NO.        : 7,201,994 B2
APPLICATION NO. : 10/203237
DATED             : April 10, 2007
INVENTOR(S)      : Shoichiro Watanabe et al.

It is certified that error appears in the above-identified patent and that said Letters Patent is hereby corrected as shown below:

Title page, Section (73)

Delete and insert the following:

-- Matsushita Electric Industrial Co., Ltd., Osaka (JP) and
      Ube Industries, Ltd., Yamaguchi (JP) --.

Signed and Sealed this

Eleventh Day of December, 2007

JON W. DUDAS
*Director of the United States Patent and Trademark Office*